(12) United States Patent
Paris et al.

(10) Patent No.: US 10,957,460 B2
(45) Date of Patent: Mar. 23, 2021

(54) RADIOISOTOPE GENERATOR HAVING A STATIONARY PHASE COMPRISING TITANIUM OXIDE

(71) Applicant: Institut National des Radioéléments, Fleurus (BE)

(72) Inventors: Jérôme Paris, Heron (BE); Thierry Dierickx, La Louvière (BE); Philippe Vanwolleghem, Ottignies-Lovain-le-Neuve (BE); Valery Host, Ohey (BE); Steve Dierick, Hoeilaart (BE)

(73) Assignee: INSTITUT NATIONAL DES RADIOÉLÉMENTS, Fleurus (BE)

( * ) Notice: Subject to any disclaimer, the term of this patent is extended or adjusted under 35 U.S.C. 154(b) by 518 days.

(21) Appl. No.: 15/516,624

(22) PCT Filed: Oct. 6, 2015

(86) PCT No.: PCT/EP2015/072976
§ 371 (c)(1),
(2) Date: Apr. 3, 2017

(87) PCT Pub. No.: WO2016/055434
PCT Pub. Date: Apr. 14, 2016

(65) Prior Publication Data
US 2018/0233243 A1   Aug. 16, 2018

(30) Foreign Application Priority Data
Oct. 7, 2014  (BE) .................... 2014/0747

(51) Int. Cl.
*G21G 1/00*   (2006.01)
*C01G 23/04*  (2006.01)

(52) U.S. Cl.
CPC ........... *G21G 1/0005* (2013.01); *C01G 23/04* (2013.01); *C01P 2004/60* (2013.01); *C01P 2004/61* (2013.01); *C01P 2006/12* (2013.01); *C01P 2006/14* (2013.01); *C01P 2006/16* (2013.01)

(58) Field of Classification Search
CPC ... G21G 2001/0042; G21G 2001/0021; G21G 2001/0031; G21G 2001/0026; G21G 2001/0073; G21G 2001/0057; G21G 2001/0084; G21G 1/10
See application file for complete search history.

(56) References Cited

U.S. PATENT DOCUMENTS

| | | | |
|---|---|---|---|
| 6,337,055 B1 * | 1/2002 | Betenekov | B01J 20/0211 423/2 |
| 2006/0171877 A1 * | 8/2006 | Dadachov | B01J 20/0211 423/610 |
| 2013/0312570 A1 | 11/2013 | Barbosa | |
| 2014/0140462 A1 | 5/2014 | Barbosa | |

OTHER PUBLICATIONS

Qazi et al. "Preparation and evaluation of hydrous titanium oxide as a high affinity adsorbent for molybdenum (99Mo) and its potential for use in 99mTc generators". Radiochim. Acta 99, 231-235 (2011) (Year: 2011).*

International Search Report dated Jan. 15, 2016, issued in corresponding International Application No. PCT/EP2015/072976, filed Oct. 6, 2015, 4 pages.

* cited by examiner

*Primary Examiner* — Ryan B Huang
(74) *Attorney, Agent, or Firm* — Christensen O'Connor Johnson Kindness PLLC

(57) ABSTRACT

The use of titanium oxide as a stationary phase in a radioisotope generator device, wherein said titanium oxide comprises particles having a $d_{50}$ comprised between 10 and 350 μm, and having a BET specific surface area comprised between 30 and 300 m²/g, preferably greater than 60 m²/g, and of a generator comprising the stationary phase used.

16 Claims, 2 Drawing Sheets

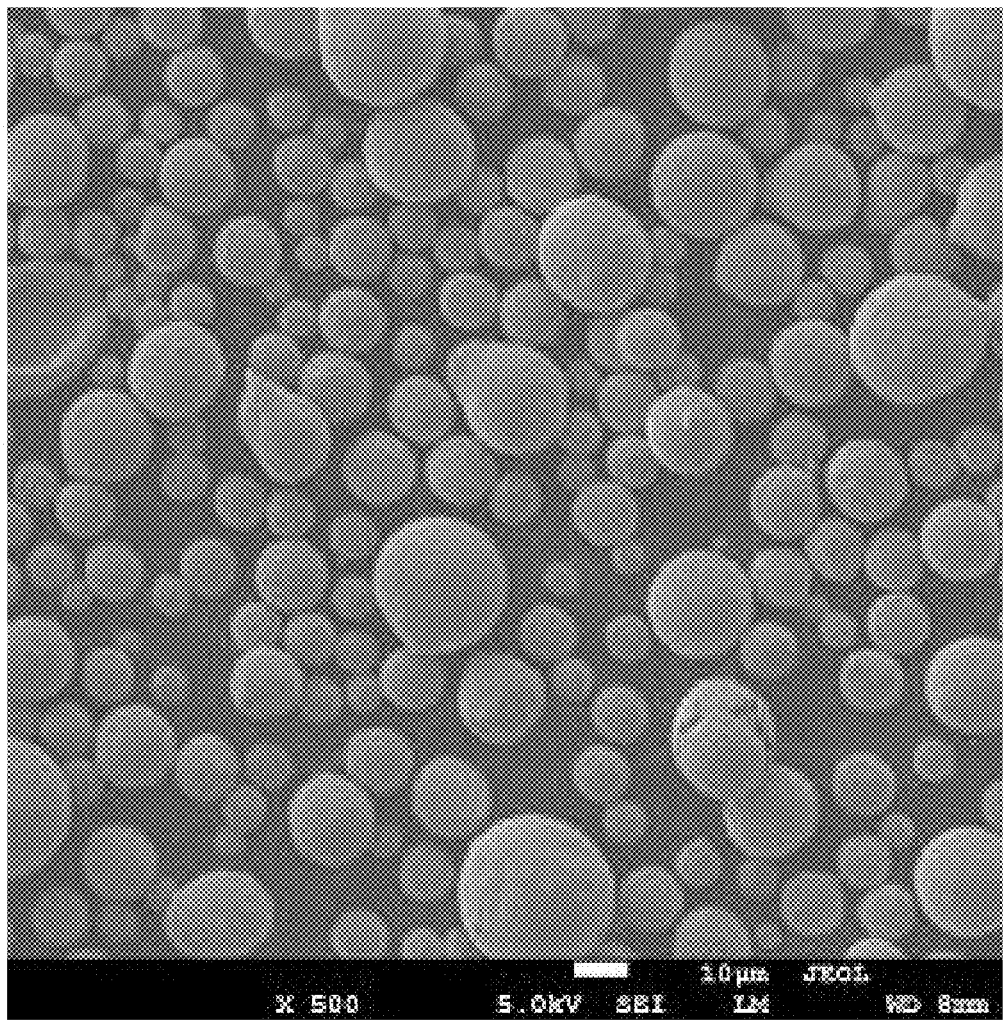
FIG. 1.-

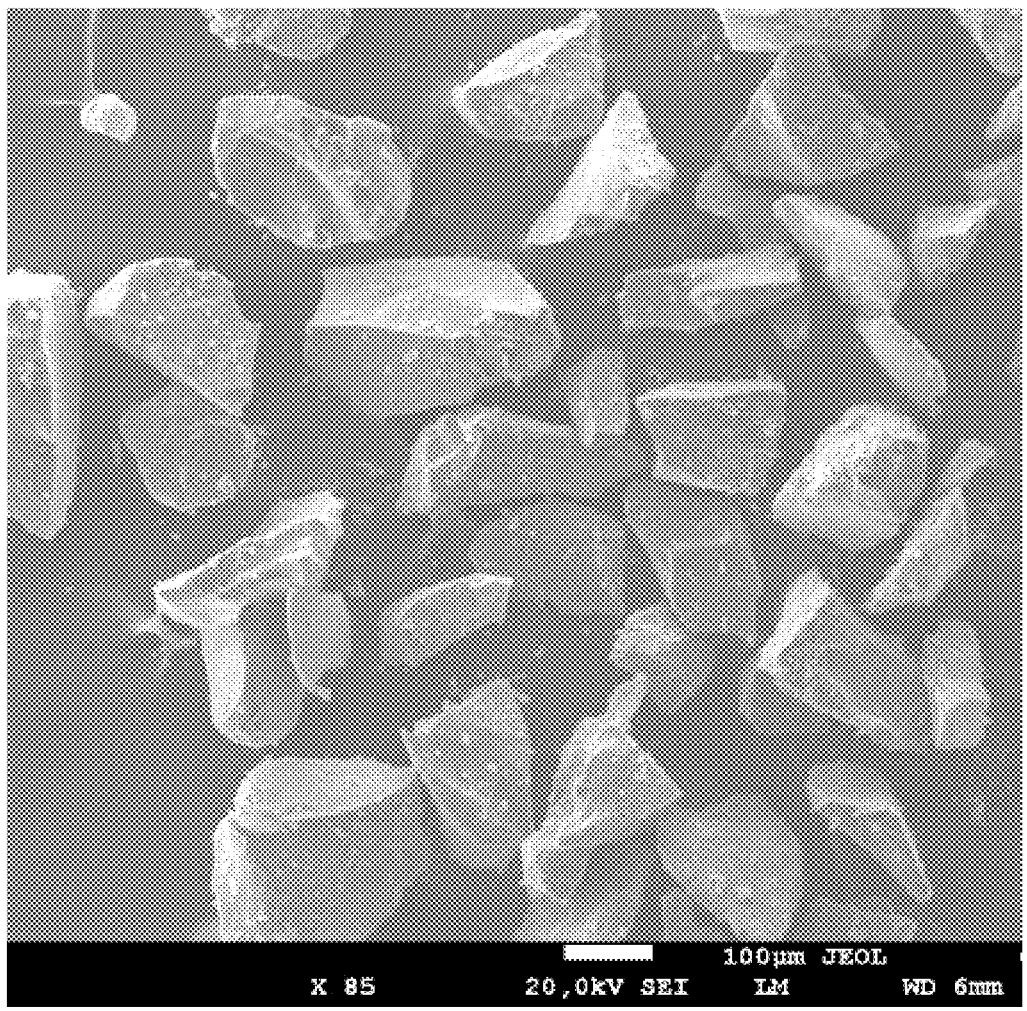
*FIG. 2.-*

RADIOISOTOPE GENERATOR HAVING A STATIONARY PHASE COMPRISING TITANIUM OXIDE

The present invention relates to a use of titanium oxide as a stationary phase in a radioisotope generator device and to a radioisotope generator containing it.

Such uses of stationary phases are well known in the state of the art, see for example document WO2013/082699. This document discloses a stationary phase including inorganic metal oxides which may be used for isolating a compound of interest from a crude sample or for isolating a daughter radioisotope of a parent radioisotope. The disclosed inorganic metal oxides are for example titanium oxides, aluminum oxides, tin oxides, zirconium oxides, or even silicon oxides. The teaching of this document in reality lies in the comparison of metal oxide particles for which the external surfaces are smoothed for removing the fragile edges of particles of irregular shape, having a particle size comprised between 10 µm and 300 µm.

Document US 2013/0048568, as for it, discloses a sorption material for radioactive ions which may be used in nuclear medicine, biomedical research and diagnostic. This document inter alia tackles the problem of the $^{68}$Ge/$^{68}$Ga pair in the applications mentioned above for which the $^{68}$Ge content should be as low as possible as a contamination of $^{68}$Ga since the lifetime period of $^{68}$Ge is much longer than that of $^{68}$Ga. Further, the stationary phases in this type of applications should allow limitation of the coordination reactions with the competing contaminants which may be detrimental to the labeling level yields with $^{68}$Ga. The disclosed sorption material comprises a crystalline mesoporous and/or microporous powder of zirconium, titanium, tin or germanium oxide as well as their combinations in which the particle sizes are comprised between 10 and 200 µm. The average pore diameter measured by the disclosed BET method is preferably comprised between 10 and 200 nm. This document also discloses size distributions between mesopores, macropores and micropores.

Other teachings, such as Chakravarty et al. (Separation Science and Technology no. 48, 2013) teach comparisons between various oxides such as zirconium, titanium or aluminum oxides for preparing radiopharmaceutical molecules from a parent radioisotope. The tested oxides are taught as being present in the form of nanometric particles and with high porosity characteristics. According to this document, the stationary phases based on nanometric aluminum oxide are widely preferred while those based on zirconium or titanium oxides are adequate, but have together similar results in terms of «breakthrough», but clearly inferior to those of aluminum oxide.

Document U.S. Pat. No. 6,337,055 discloses a method for extracting $^{99}$Mo from a uranium solution while resorting to an inorganic adsorbent material. The adsorbent material has a specific surface area comprised between 100 and 350 m$^2$/g and a particle size comprised between 0.1 and 2.0 mm. This adsorbent material comprises titanium dioxide which comprises between 5 and 40% by moles of zirconium hydroxide.

Although these teachings seem to be promising in terms of possibilities of developing stationary phases for separating radioisotopes, certain additional concerns have still to be taken into consideration. On the one hand, the standards of pharmacopeias have to be met, but it is also required that the radioisotopes meet separation efficiency conditions and that the stationary phases meet the requirements for facilitating use.

The object of the invention is to overcome the drawbacks of the state of the art by providing use of a stationary phase in a radioisotope generator which is simple to use while giving the possibility of attaining satisfactory yields and meeting the pharmacopeia standards.

In order to solve this problem, the use according to present invention is characterized in that said titanium oxide comprises particles having a $d_{50}$ comprised between 10 and 350 µm, and having a BET specific surface area comprised between and 300 m$^2$/g, preferably greater than 60 m$^2$/g.

In the sense of the present invention, the notation $d_X$ represents a diameter, expressed in µm, relatively to which X % of the measured titanium oxide particles are smaller.

Also in the sense of the present invention, the BET specific surface area of the titanium oxide particles is the specific surface area of these particles as measured by nitrogen adsorption manometry and calculated according to the BET method.

As this may be ascertained, the stationary phase used within the scope of the present invention gives the possibility of attaining highly surprising performances in terms of yield and of simplicity of use.

Indeed, the combination of the particle size characteristics of titanium oxide ($d_{50}$) and of the BET specific surface area of the particles in the stationary phase allow favorable use for a radioisotope generator device which is particularly suitable for applications in nuclear medicine, biomedical research and diagnostic.

According to the invention, the size of the titanium oxide particles ($d_{50}$) comprised between 10 and 350 µm, as well as the BET specific surface area thereof which is comprised between 30 and 300 m$^2$/g and preferably greater than 60 m$^2$/g, gives the possibility of attaining a particularly favorable radioisotope elution result for the elution of the daughter radioisotope while keeping captive in the stationary phase the parent radioisotope. This gives the possibility of obtaining a specific elution, during which the «breakthrough» phenomenon is reduced.

The «breakthrough» phenomenon corresponds to the parent radioisotopes being undesirably carried away by the eluent from the stationary phase and they are found again in the eluate at the outlet of the radioisotope generator.

By the terms of «parent radioisotope» and «parent radioisotopes» are meant in the sense of the present invention, the radioisotope initially loaded on the stationary phase as well as the intermediate generation radioisotopes which will provide the daughter radioisotope. Indeed, in certain cases, the decomposition of the parent radioisotope produces a compound with a very short half-lifetime which in turn decomposes into the daughter radioisotope of interest. These radioisotopes of an older generation with respect to those of the daughter radioisotopes of interest are called «parent radioisotope(s)».

By the terms of «daughter radioisotope(s)», are meant in the sense of the present invention, the radioisotope(s) from the decomposition which will be the eluted radioactive molecule of interest for uses in nuclear medicine, biomedical research and diagnostic.

In the use according to the present invention, the size of the titanium oxide particles as well as the specific surface area act together synergistically for capturing and retaining the parent radioisotope, but also for promoting the passing of the eluent through the column for which the packing is partly optimum by the size of the titanium oxide particles. Both of these characteristics together thus allow the carrying away of the parent isotope to be minimized by improving its retention and by maximizing the outflow of the daughter radioisotope.

Indeed, in radioisotope generators, the parent isotope has a longer lifetime than the daughter radioisotope used in medical applications. Ideally, the daughter radioisotope has a shorter lifetime which allows its administration to the human body and therefore reduction of the detrimental effects due to radioactivity.

The daughter radioisotope is continuously produced by disintegration of the parent radioisotope(s). When a daughter radioisotope amount estimated to be sufficient is present, the latter may then be recovered by elution. In order that a radioisotope generator finds adequate use in medical or assimilated applications as mentioned above, it is required that the concentration of parent isotope be reduced in the eluate and therefore that the «breakthrough» phenomenon of the parent radioisotope be as low as possible.

Further, certain types of stationary phase give the possibility of attaining a selective elution of the parent radioisotope but only give the possibility of recovering the daughter radioisotope in a substantially consequent eluent volume, which requires subsequent concentration. The latter, although allowing a final adequate concentration of daughter radioisotope per unit of collected volume to be obtained, has the consequence of a reduction in the extraction yield, but also a loss of activity of the daughter radioisotope in the collected volume, which has an impact on the industrial applicability of the stationary phases existing in hospital surroundings, which themselves have to attain more performing yields for the contemplated uses.

The stationary phase used according to the present invention in a particularly surprising way gave the possibility of attaining this goal by providing specific elution of the daughter radioisotope from the stationary phase on which the parent radioisotope is adsorbed, i.e. in high concentrations, with reduced breakthrough of the parent radioisotope as soon as the combination of the titanium oxide particle size $d_{50}$ comprised between 10 and 350 μm and of the BET specific surface area of the titanium oxide particles comprised between 30 and 300 m$^2$/g, preferably greater than 60 m$^2$/g, acts, in addition to the high affinity of titanium oxide for the parent radioisotope and low affinity for the daughter radioisotope, on the effective capture of the parent radioisotope on the one hand, but also on the migration rate of the daughter radioisotope which allows collection of a fraction of daughter radioisotopes of reduced volume. Additionally, the rapidity of the elution which allows the collection of a reduced volume highly concentrated in daughter radioisotope, also allows reduction in the migration rate of the parent radioisotope due to the passing of the eluent.

Of course other additional factors play a role on the performance of the elution of the daughter radioisotope like the size of the column, the roundness of the particles, the applied eluent flow rate, the potentially imposed eluate output flow rate, . . . .

According to the present invention, the stationary phase used in a radioisotope generator gives the possibility of collecting a reduced volume of eluate in which an activity of daughter radioisotopes is measured, comprised in a range of values from 60.0% to 100.0%, preferably from 70.0% to 100.0%, more particularly greater than 80.0%, based on the activity of daughter radioisotopes on the column at the moment of the elution, in the generator, while the activity of parent radioisotopes in the eluate is, as for it, comprised in a range of values from 0.0% to 30.0% relatively to the daughter radioisotope activity of said eluate.

Advantageously, the stationary phase used in a radioisotope generator gives the possibility of collecting a reduced volume of eluate wherein an activity of parent radioisotopes is measured, comprised in a range of values from 0.0% to 20%, advantageously from 0.0% to 10%, more preferentially from 0.0% to 5.0%, still more preferentially, from 0.0% to 2.0%, more advantageously, from 0.0% to 1.0%, based on the daughter radioisotope activity of said eluate. Advantageously, the activity of parent radioisotopes is equal to 0.0 mCi.

The pairs of parent-daughter radioisotopes which may advantageously be separated with view to medical applications or diagnostic are for example selected from the group consisting of the $^{68}$Ge/$^{68}$Ga, $^{82}$Sr/$^{82}$Rb, $^{99}$Mo/$^{99m}$Tc, $^{188}$W/$^{188}$Re, $^{62}$Zn/$^{62}$Cu, $^{113}$Sn/$^{113}$In, $^{228}$Th/$^{212}$Bi, $^{225}$Ac/$^{213}$Bi, $^{90}$Sr/$^{90}$Y, $^{72}$Se/$^{72}$As, $^{44}$Ti/$^{44}$Sc, and $^{224}$Ra/$^{212}$Pb pairs.

Advantageously, in the use according to the invention of the stationary phase, the titanium oxide particles more specifically have a $d_{50}$ comprised between 10 to 100 μm, more preferentially between 20 and 80 μm, advantageously between 25 and 60 μm.

The limited particle size range of titanium oxide in the stationary phase according to the present invention thereby gives the possibility of obtaining optimum packing conditions allowing improvement in the selectivity of the elution in favor of the daughter radioisotope collected in the eluate as soon as these ranges of specific sizes give the possibility to the inter-particle spaces of guiding the eluent flow through the bed of titanium oxide particles which reduces the carrying away of the parent radio-isotope by the eluent but also improves the rapidity of the elution which gives the possibility of obtaining eluate fractions which are concentrated in daughter radioisotope.

In a particular embodiment of the use according to the present invention, the titanium oxide particles have a $d_{95}$ comprised between 10 and 525 μm. Accordingly, the distribution of the titanium oxide particle sizes is substantially targeted and narrow.

Preferably, in the present use, said titanium oxide particles have pores having a diameter, the average diameter of the pores being comprised between 1 and 30 nm, preferably between 1 and 20 nm, more preferentially between 1 and 15 nm, more particularly between 2 and 8 nm, and still advantageously between 3 and 5 nm.

In a preferred embodiment of the use according to the invention, the titanium oxide particles have a BJH pore volume greater than or equal to 0.1 cm$^3$/g, preferably equal to or greater than 0.12 cm$^3$/g, preferably equal to or greater than 0.15 cm$^3$/g, in particular equal to or greater than 0.20 cm$^3$/g, or even equal to or greater than 0.25 cm$^3$/g, preferably, greater than or equal to 0.30 cm$^3$/g, more particularly up to 0.4 cm$^3$/g, still more advantageously up to 0.45 cm$^3$/g.

In the sense of the present invention, by «pore volume» is meant the volume of the pores measured by nitrogen adsorption manometry and calculated according to the BJH desorption method.

In further a preferred mode of use according to the invention, the titanium oxide particles are present in a weight proportion of at least 50% by weight, based on the total weight of stationary phase.

More particularly, according to the invention, the titanium oxide particles have a proportion $d_{90}/d_{10}$ of less than or equal to 120 μm, preferably less than or equal to 80 μm, more particularly less than or equal to 60 μm, advantageously, less than or equal to 50 μm.

Advantageously, the titanium oxide particles have a BET specific surface area greater than or equal to 70 m$^2$/g, preferably greater than or equal to 80 m$^2$/g.

In an advantageous use according to the present invention, said titanium oxide is selected from the group consisting of TiO, TiO$_2$, TiO$_2$.xH$_2$O (with x being an integer comprised between 0 and 10), the titanium dioxide may be in the anatase or rutile crystalline form, combinations thereof and mixtures thereof.

More particularly, in the use according to the present invention, the titanium oxide particles are substantially spherical.

Other forms of use according to the invention are indicated in the appended claims.

The object of the invention is also a radioisotope generator comprising a stationary phase contained in a tank connected to an eluent conduit and an eluate outflow.

Typically, a radioisotope generator is used inter alia in the field of nuclear medicine for producing an eluate containing a daughter radioisotope from a stationary phase loaded with parent radioisotopes which spontaneously disintegrate into daughter radioisotopes which are intended to be eluted by an eluent.

These daughter radioisotopes in the eluate are intended to be used as such or to be bound to a molecule, like for example a biocompatible molecule (protein, antibody, etc.), so as to form a radio-labeled molecule, resulting from the combination of the daughter radioisotope with the molecule, which is generally then administered to a patient via an injection route, typically as a solution or liquid suspension, when the molecule is biocompatible. The administration of the radioisotope or of the radio-labeled molecule in this case allows diagnostic or treatment of certain cancers, depending on the selection of the radioisotope and/or of the biocompatible molecule.

In the particular scope of the preparation of a solution or suspension comprising a radioisotope or radio-labeled biocompatible molecule intended to be administered to a patient, many constraints occur.

Indeed, first of all, one should make sure that the production and the sampling of the eluate comprising the daughter radioisotopes, as well as the labeling reaction of the biocompatible molecule with the daughter radioisotope in order to form the radio-labeled molecule, are carried out under adapted conditions for the use, for example sterile conditions may be applied. This generates a need for having a performing stationary phase which requires minimum possible handling of the eluate.

Next, as mentioned above, in order that the labeling reaction be as effective as possible, it is important to have an eluate which has a high degree of purity of daughter radioisotopes, i.e. a highly concentrated eluate in daughter radioisotopes and wherein the presence of contaminants which may parasite or inhibit the labeling reaction is sufficiently small so as not to compromise this labeling reaction.

The generator according to the present invention gives the possibility of solving these drawbacks by providing a generator, characterized in that said stationary phase comprises particles having a d$_{50}$ comprised between 10 and 350 µm, and having a BET specific surface area comprised between 30 and 300 m$^2$/g, preferably greater than 60 m$^2$/g.

In the generator according to the present invention, said stationary phase is contained in said tank connected to said eluent conduit and to said eluate outflow, is positioned in a shielded box, preferably at least partly made in a dense material, such as tungsten or lead.

In the generator according to the present invention, said stationary phase is advantageously loaded with a parent radioisotope which spontaneously disintegrates into a daughter radioisotope.

In the generator according to the present invention, said titanium oxide particles more particularly have a d$_{50}$ comprised between 10 to 100 µm, more preferentially between 20 and 80 µm, advantageously between 25 and 60 µm.

In the generator according to the present invention, said titanium oxide particles advantageously have a d$_{95}$ comprised between 10 and 525 µm.

In the generator according to the present invention, said titanium oxide particles preferably have pores having a diameter, the average diameter of the pores being comprised between 1 and 30 nm, preferably between 1 and 20 nm, more preferentially between 1 and 15 nm, more particularly between 2 and 8 nm, and still advantageously between 3 and 5 nm.

In the generator according to the present invention, said titanium oxide particles more specifically have a BJH pore volume greater than or equal to 0.1 cm$^3$/g, preferably equal to or greater than 0.12 cm$^3$/g, preferably equal to or greater than 0.15 cm$^3$/g, in particular equal to or greater than 0.20 cm$^3$/g, or even equal to or greater than 0.25 cm$^3$/g, preferably, greater than or equal to 0.30 cm$^3$/g, more particularly up to 0.4 cm$^3$/g, still more advantageously up to 0.45 cm$^3$/g.

In the generator according to the present invention, said titanium oxide particles are preferably present in a weight proportion of at least 50% by weight, based on the total weight of stationary phase.

In the generator according to the present invention, said titanium oxide particles in particular have a proportion d$_{90}$/d$_{10}$ less than or equal to 120 µm, preferably less than or equal to 80 µm, more particularly less than or equal to 60 µm, advantageously less than or equal to 50 µm.

Advantageously, the generator according to the invention includes titanium oxide particles which have a BET specific surface area greater than or equal to 70 m$^2$/g, preferably greater than or equal to 80 m$^2$/g.

In the generator according to the present invention, said titanium oxide is selected from the group consisting of TiO, TiO$_2$, TiO$_2$.xH$_2$O (with x being an integer comprised between 0 and 10), the titanium dioxide may be in an anatase or rutile crystalline form, combinations thereof and mixtures thereof.

In the generator according to the present invention, said titanium oxide particles are substantially spherical.

Other embodiments of the generator according to the invention are indicated in the appended claims.

Other features, details and advantages of the invention will become apparent from the description given hereafter, not as a limitation and with reference to the examples.

EXAMPLES

Example 1

Operating Procedure

Loading the Generator

The generator of Example 1 includes a titanium oxide stationary phase loaded with the radioisotope $^{99}$Mo in order to carry out production of the daughter radioisotope $^{99m}$Tc as well as separation of the radioisotopes of the $^{99}$Mo/$^{99m}$Tc (parent/daughter) pair on this stationary phase comprising titanium oxide particles having a particle size of 35 µm and a BET specific surface area of 120 m$^2$/g in a generator according to the invention, achieved in an aqueous phase with acid pH. The loaded activity on the stationary phase was 27.9 mCi at the loading time $T_0$.

Elution Test

The eluent tank is a bag of a saline NaCl solution concentrated to 0.9% by volume.

The generator was daily eluted during a determined period in order to track the elution yields and the desalting rates of $^{99}$Mo in each of the daily sampled eluates («breakthrough»).

Results

The elution yield Y (in %) within the scope of the present invention is meant as the ratio of the activity of $^{99m}$Tc [A($^{99m}$Tc)$^{el}$ in mCi] in the eluate and of the activity of $^{99m}$Tc [A($^{99m}$Tc)$^{col}$ in mCi] which is present on the column at the moment of elution and is calculated according to the following formula:

$$Y \text{ (in \%)} = 100 \times [A(^{99m}Tc)^{el}/A(^{99m}Tc)^{col}]$$

The $^{99}$Mo desalting rates are given in % and correspond to the following ratio:

$$R \text{ (in \%)} = 100 \times [A(^{99}Mo)^{el}/A(^{99m}Tc)^{el}],$$

wherein A($^{99}$Mo)$^{el}$ represents the $^{99}$Mo activity in the eluate.

The results are illustrated in Table 1.—

TABLE 1

$^{99}$Mo/$^{99m}$Tc pair on titanium oxide - test 1

| Time T | Y (in %) | R (%)* |
|---|---|---|
| $T_0$ | 99 | <1.4 10$^{-6}$ |
| $T_0$ + 1 day | 91 | <1.6 10$^{-6}$ |
| $T_0$ + 2 days | 93 | <2.0 10$^{-6}$ |
| $T_0$ + 8 days | 95 | <1.9 10$^{-6}$ |
| $T_0$ + 9 days | 95 | <3.2 10$^{-7}$ |
| $T_0$ + 10 days | 95 | <1.4 10$^{-6}$ |
| $T_0$ + 11 days | 97 | <1.6 10$^{-6}$ |
| $T_0$ + 13 days | 94 | <6.4 10$^{-6}$ |
| $T_0$ + 14 days | 96 | <6.9 10$^{-6}$ |
| $T_0$ + 15 days | 98 | <6.8 10$^{-6}$ |
| $T_0$ + 16 days | 98 | <7.1 10$^{-6}$ |
| $T_0$ + 17 days | 95 | <9.0 10$^{-6}$ |
| $T_0$ + 21 days | 94 | <3.0 10$^{-6}$ |
| $T_0$ + 22 days | 94 | <2.1 10$^{-6}$ |

*The European pharmacopeia specifications (Monographs of sodium pertechnetate ($^{99m}$Tc) for injections, produced by fission 'Eur. Phar. 0124' and monographs of sodium pertechnetate ($^{99m}$Tc) for injections not produced by fission 'Eur. Phar. 0283') provide a threshold value which should not be exceeded, of the order of 0.1%.

Example 2

The generator of Example 2 includes titanium oxide stationary phase loaded with the radio-isotope $^{68}$Ge in order to carry out production of the daughter radio-isotope $^{68}$Ga as well as separation of the radio-isotopes of the $^{68}$Ge/$^{68}$Ga (parent/daughter) pair on this stationary phase in an aqueous phase with an acid pH. The stationary phase comprises titanium oxide particles having a particle size of 37 μm and a BET specific surface area of 125 m$^2$/g. The activity loaded on the stationary phase was 4.1 mCi at the loading time $T_0$.

Elution Test

The eluent tank is a bag of an HCl solution at 0._ M.

The generator was daily eluted for a determined period in order to track the elution and desalting rate yields of $^{68}$Ge in each of the daily sampled eluates («breakthrough»).

The yield and desalting rate results are illustrated in Table 2.—for Example 1 and Example 2.

TABLE 2

| Pair // stationary phase | Y (in %) | R (in %)* |
|---|---|---|
| $^{68}$Ge/$^{68}$Ga // titanium oxide$^{§}$ | >70%$^{§§§}$ | 10$^{-5}$ – 10$^{-6}$ $^{§§§§}$ |
| $^{99}$Mo/$^{99m}$Tc // titanium oxide$^{§§}$ | ~95% | ~10$^{-6}$ – 10$^{-7}$ |

$^{§}$The values measured at time T = $T_0$
$^{§§}$Average values
$^{§§§}$Y (in %) = 100 × [A($^{68}$Ga)$^{el}$/A($^{68}$Ge)$^{col}$]
$^{§§§§}$R (in %) = 100 × [A($^{68}$Ge)$^{el}$/A($^{68}$Ga)$^{el}$], wherein A($^{68}$Ge)$^{el}$ represents the $^{68}$Ge activity in the eluate.
*The specifications of the European pharmacopoeia (Monographs of sodium pertechnetate ($^{99m}$Tc) for injection, produced by fission 'Eur. Phar. 0124'; sodium pertechnetate ($^{99m}$Tc) monographs for injection not produced by fission 'Eur. Phar. 0283' provide a threshold value which should not be exceeded, of the order of 0.1%. The 'gallium ($^{68}$Ga) (chloride) solution for radio-labelling' 'Eur Phar 2464' provides a threshold value which should not be exceeded, of the order of 0.01%.

As shown in the results shown above, the parent radio-isotope activity in the eluate is on average less than a factor 10$^{-7}$-10$^{-9}$ with respect to the activity of daughter radio-isotopes in the same eluate, which means a parent radio-isotope activity of less than 1.0% with respect to the total activity of parent and daughter radio-isotopes of the eluate, which is quite remarkable.

Comparative Example 1

A stationary phase based on titanium oxide having an average particle size $d_{50}$ of less than 10 μm was tested for determining its affinity for germanium. In this comparative example, the pressure drop was too significant requiring the need for a pump in order to allow proper elution. Accordingly, the application of such a stationary phase is not feasible.

Comparative Example 2

A stationary phase based on titanium oxide having an average particle size $d_{50}$ of about 600 μm was tested for determining its affinity for germanium. In this comparative example, the number of theoretical plates of the column was not too high and the capacity of this column was too small. Accordingly, the application of such a stationary phase is not feasible.

Comparative Example 3

A stationary phase based on silicon dioxide having an average particle size $d_{50}$ of about 50 μm, a BET specific surface area of 487 m$^2$/g and a BJH porous volume of 0.81 cm$^3$/g was tested in order to determine its affinity for germanium. The silicon dioxide particles have a spherical shape. According to this comparative example, the distribution coefficient ($K_D$) is equal to 4.

Example 3

A stationary phase based on titanium oxide having an average particle size $d_{50}$ of 25 μm, a BET specific surface area of 125 m$^2$/g and a BJH pore volume of 0.23 cm$^3$/g was tested for determining its affinity for germanium. Indeed, the higher the latter, the less the expected $^{68}$Ge breakthrough in the eluate of the generator will be significant. This was achieved by measuring the distribution coefficients ($K_D$) of this element (a known amount of $^{68}$Ge was used) between the studied solid phase and an aqueous solution with an acid pH.

The $K_D$ (expressed in ml/g) is given by the relationship:

$$K_d=[(A_i-A_{eq})V]/[A_{eq}m]$$

With:

$A_i$=$^{68}$Ge initial activity present in 1 ml of aqueous solution $A_{eq}$=activity at equilibrium in 1 ml of aqueous solution (=non-adsorbed residual activity)

V=total volume of aqueous solution used (ml)

m=amount of stationary phase used (g)

The distribution coefficient as well as the characteristics of the stationary phase are shown in Table 3.—

TABLE 3

| Adsorption of $^{68}$Ge in an acid aqueous phase Equilibration time: 5 hours | | | |
|---|---|---|---|
| Stationary phase | | | |
| Measured BET specific surface area (m²/g) | Measured pore diameter (Å) | Measured BJH pore volume (cm³/g) | $K_D$ (ml/g) |
| Titanium oxide 25 μm | 125 | 63 | 0.23 | 1783 |

Example 4

A stationary phase based on titanium oxide having an announced average particle size $d_{50}$ of 80 μm, a BET specific surface area of 97 m²/g and a BJH pore volume of 0.25 cm³/g was tested for determining its affinity for germanium. The distribution coefficient ($K_D$) of this element (a known amount of $^{68}$Ge was used) between the studied solid phase and an aqueous solution with an acid pH was determined like in Example 3.

The distribution coefficient as well as the characteristics of the stationary phase are shown in Table 4.

TABLE 4

| Adsorption of $^{68}$Ge in an acid aqueous phase Equilibration time: 5 hours | | | |
|---|---|---|---|
| Stationary phase | | | |
| Measured BET specific surface area (m²/g) | Measured pore diameter (Å) | Measured BJH pore volume (cm³/g) | $K_D$ (ml/g) |
| Titanium oxide 80 μm | 97 | 78 | 0.237 | 425 |

Comparative Example 4

A stationary phase based on titanium oxide having an announced average particle size $d_{50}$ of 80 μm, a BET specific surface area of 12 m²/g, a pore diameter of 300 Å and a BJH pore volume of 0.055 cm³/g was tested for determining its affinity for germanium. The distribution coefficient ($K_D$) of this element (a known amount of $^{68}$Ge was used) between the studied solid phase and an aqueous solution with an acid pH was determined like in Example 3.

The distribution coefficient as well as the characteristics of the stationary phase, are shown in Table 5.

TABLE 5

| Adsorption of $^{68}$Ge in an acid aqueous phase, Equilibration time: 5 hours | | | |
|---|---|---|---|
| Stationary phase | | | |
| Measured BET specific surface area (m²/g) | Pore diameter (Å) | Measured BJH pore volume (cm³/g) | $K_D$ (ml/g) |
| Titanium oxide 80 μm | 12 | 300 | 0.055 | 100 |

Comparative Example 5

A stationary phase based on titanium oxide having an announced average particle size $d_{50}$ of 80 μm, a BET specific surface area of 7 m²/g, a pore diameter of 2,000 Å and a BJH pore volume of 0.037 cm³/g was tested for determining its affinity for germanium. The distribution coefficient ($K_D$) of this element (a known amount of $^{68}$Ge was used) between the studied solid phase and an aqueous solution with an acid pH was determined like in Example 3.

The distribution coefficient as well as the characteristics of the stationary phase are shown in Table 6.

TABLE 6

| Adsorption of $^{68}$Ge in an acid aqueous phase Equilibration time: 5 hours | | | |
|---|---|---|---|
| Stationary phase | | | |
| Measured BET specific surface area (m²/g) | Pore diameter (Å) | Measured BJH pore volume (cm³/g) | $K_D$ (ml/g) |
| Titanium oxide 80 μm | 7 | 2000 | 0.037 | 60 |

Example 5

A stationary phase based on titanium oxide having an average particle size $d_{50}$ of 80 μm, an announced BET specific surface area of 108 m²/g and wherein the particles are substantially spherical, was tested for determining the initial $^{68}$Ge breakthrough. The $^{68}$Ge breakthrough was determined like in Example 2 and showed values of less than $4 \cdot 10^{-5}$ (R in %). The titanium oxide particles are shown in FIG. 1 (scanning electron microscopy photograph).

Comparative Example 6

A stationary phase based on titanium oxide having an average particle size $d_{50}$ of 152 μm, an announced BET specific surface area of 259 m²/g and wherein the particles are of a non-spherical shape and irregular, was tested for determining the initial $^{68}$Ge breakthrough. The $^{68}$Ge breakthrough was determined like in Example 2 and showed values comprised between $1 \cdot 10^{-2}$ and $2 \cdot 10^{-2}$ (R in %). The titanium oxide particles are shown in FIG. 2 (scanning electron microscopy photograph).

As this may be ascertained, the elution performances and in terms of breakthrough are not as good for non-spherical particles as compared with Example 6, and this, in spite of a much larger BET specific surface area. Further, the 68Ga elution yield is also lower in the Comparative Example 6 for the non-spherical titanium oxide particles (<30%) as compared with that for the spherical titanium oxide particles (70%).

Comparative Example 7

Table 7 illustrates the results obtained for 4 types of stationary phases based on titanium oxide.

The first stationary phase consists of titanium oxide having a particle size of 37 µm, a BET specific surface area of 125 m$^2$/g, a pore diameter of 64 Å, a BJH pore volume of 0.248 cm$^3$/g and a distribution coefficient (Kd) of 2,245 ml/g.

The second stationary phase consists of titanium oxide having a particle size of 105 µm, a BET specific surface area of 140 m$^2$/g, a pore diameter of 60 Å, a BJH pore volume of 0.223 cm$^3$/g and a distribution coefficient (Kd) of 1,813 ml/g.

The third stationary phase consists of titanium oxide having a particle size of 160 µm, a BET specific surface area of 130 m$^2$/g, a pore diameter of 58 Å, a BJH pore volume of 0.240 cm$^3$/g and a distribution coefficient (Kd) of 1,922 ml/g.

The fourth stationary phase consists of titanium oxide having a particle size of 265 µm, a BET specific surface area of 125 m$^2$/g, a pore diameter of 61 Å, a BJH pore volume of 0.220 cm$^3$/g and a distribution coefficient (Kd) of 1,940 ml/g.

TABLE 7

| | Stationary phase | | | |
| --- | --- | --- | --- | --- |
| | Measured BET specific surface area (m$^2$/g) | Pore diameter (Å) | Measured BJH pore volume (cm$^3$/g) | $K_D$ (ml/g) |
| Titanium oxide 37 µm | 125 | 64 | 0.248 | 2245 |
| Titanium oxide 105 µm | 140 | 60 | 0.223 | 1813 |
| Titanium oxide 160 µm | 130 | 58 | 0.240 | 1922 |
| Titanium oxide 265 µm | 125 | 61 | 0.220 | 1940 |

Considering Table 7, it appears that the increase in the size of titanium oxide particles does not directly and proportionately influence the characteristics of the stationary phase in terms of specific surface area, of pore diameter or further of pore volume.

It is quite understood that the present invention is by no means limited to the embodiment described above and that many modifications may be brought thereto without departing from the scope of the appended claims.

The invention claimed is:

1. A method of using titanium oxide as a stationary phase for isolating a daughter radioisotope of a parent radioisotope in a radio-isotope generator device, the method comprising:
loading the stationary phase with the parent radioisotope; and
eluting the daughter radioisotope from the stationary phase,
wherein the daughter radioisotope is a decay product of the parent radioisotope, and wherein said titanium oxide comprises particles having a d$_{50}$ between 10 and 350 µm, and having a BET specific surface area comprised between 30 and 300 m$^2$/g.

2. The method according to claim 1, wherein the titanium oxide particles have a d$_{50}$ between 10 and 100 µm.

3. The method according to claim 1, wherein said titanium oxide particles have pores having a diameter, the average pore diameter being between 1 and 30 nm.

4. The method according to claim 1, wherein the titanium oxide particles have a BJH pore volume greater than or equal to 0.1 cm$^3$/g.

5. The method according to claim 1, wherein the titanium oxide particles have a BET specific surface area between 70 m$^2$/g and 300 m$^2$/g.

6. The method according to claim 1, wherein the titanium oxide particles are present in a weight proportion of at least 50% by weight, based on the total weight of the stationary phase.

7. The method according to claim 1, wherein the titanium oxide particles have a proportion d$_{90}$/d$_{10}$ of less than or equal to 120.

8. The method according to claim 1, wherein the titanium oxide particles are substantially spherical.

9. The method according to claim 1, wherein the titanium oxide particles have a BET specific surface area between 60 m$^2$/g and 300 m$^2$/g.

10. A radio-isotope generator comprising a stationary phase contained in a tank connected to an eluent conduit and an eluate exit, wherein said stationary phase comprises particles of titanium oxide having a d$_{50}$ between 10 and 350 µm, and having a BET specific surface area between 30 and 300 m$^2$/g.

11. The radio-isotope generator according to claim 10, wherein said stationary phase contained in said tank connected to said eluent conduit and to said eluate exit is positioned in a shielded box.

12. The radio-isotope generator according to claim 10, wherein said titanium oxide particles have a d$_{50}$ between 10 and 100 µm.

13. The radio-isotope generator according to claim 10, wherein said titanium oxide particles have pores having a diameter, the average pore diameter being between 1 and 30 nm.

14. The radio-isotope generator according to claim 10, wherein said titanium oxide particles have a BJH pore volume greater than or equal to 0.1 cm$^3$/g.

15. The radio-isotope generator according to claim 10, wherein said titanium oxide particles are present in a weight proportion of at least 50% by weight, based on the total weight of the stationary phase.

16. The radio-isotope generator according to claim 10, wherein said titanium oxide particles are substantially spherical.

* * * * *